June 21, 1966 W. S. AUSHERMAN 3,256,887
RASP BAR FOR A THRESHING CYLINDER
Filed Jan. 30, 1964

INVENTOR.
WILLIAM S. AUSHERMAN
BY Robert E Breidenthal
ATTORNEY

United States Patent Office 3,256,887
Patented June 21, 1966

3,256,887
RASP BAR FOR A THRESHING CYLINDER
William S. Ausherman, Wichita, Kans.
(Belleville, Kans.)
Filed Jan. 30, 1964, Ser. No. 341,228
6 Claims. (Cl. 130—27)

This invention relates to new and useful improvements in threshing cylinders and the rasp bars thereof that are used in combines and threshing machines in conjunction with concaves, and this invention more particularly pertains to rasp bars of such construction and so arranged with respect to other components of the threshing cylinder that during forward rotation of the threshing cylinder the radial height of the teeth on the rasp bar tend to diminish in height on the bar as they pass any given position along the concave with such teeth having radial extremities that are spaced substantially uniformly from the axis of the cylinder throughout substantially the entire extent of the tooth.

A principal object of this invention is to provide a threshing cylinder that will have an increased suction (tendency to draw unthreshed material into space between the cylinder and the concave) when operated in conjunction with a conventional concave.

An important object of the invention is to provide a rasp bar and threshing cylinder construction such that a high degree of threshing efficiency can be obtained with a minimum of damage to the desired product such as cracking grain, etc.

Another very important object of the invention is to provide a rasp bar and threshing cylinder construction such that the initial contact of the rasp bar with the material being threshed will afford a minimum of resistance to the rotation of the threshing cylinder and yet which will tend to draw or suck the material being threshed into the space intervening between the cylinder and the concave and thereby greatly reduce any tendency of the material to be threshed from piling up or tending to clog the relatively free passage of material to be threshed into the space between the cylinder and the concave.

Still another important object of this invention is to provide a rasp bar and threshing cylinder construction such that the aforementioned objects can be realized, at least to a very large degree, under widely varying moisture content conditions of the material being threshed.

Yet another important object of the invention is to provide a rasp bar and threshing cylinder construction in accordance with the preceding objects which will minimize any necessity for adjustment of cylinder and concave spacing despite substantial changes in the condition of or the type of material being threshed.

Briefly, one broad aspect of the invention involves the rasp bars of a threshing cylinder being generally inclined, and such inclined rasp bars having longitudinally inclined teeth that terminate at their radially outward extremities throughout substantially their entire transverse extent at a substantially constant distance from the axis of the cylinder, whereby suction and threshing action (the rubbing of the material being threshed between the concave and the rasp bar teeth in a direction having a longitudinal component) are both enhanced.

Another broad aspect of the invention involves a rasp bar comprising a horizontal, substantially flat web, an upstanding row of longitudinally spaced teeth on said web, said teeth extending transversely on the web and being inclined to the longitudinal extent of the web, each of said teeth terminating at its upper extremity throughout substantially its entire transverse extent across the web along an approximately straight line that is inclined to the horizontal, and the transverse end of each tooth adjacent the highest end of said line being beveled.

Another basic aspect of the invention involves a rasp bar comprising a straight, horizontally disposed, generally flat web, a longitudinally extending row of upstanding teeth on said web, said teeth being parallel to each other and transversely inclined to the longitudinal extent of the web, each of said teeth terminating throughout substantially its entire transverse extent to conform substantially to a circular cylinder having as its axis a line parallel to and disposed below and laterally spaced from directly below the web. This aspect of the invention can optionally involve said web in transverse section having an upper surface that is at least smoothly convex upwardly.

Briefly, another broad aspect of the invention involves a rasp bar comprising an elongated horizontal and approximately flat web, a longitudinally extending row of upstanding teeth on said web, said teeth being parallel to each other and extending transversely of and angularly inclined to the longitudinal extent of the web, each of said teeth being of relatively greater height above the web at a first position adjacent one transverse extremity and of relatively lesser height above the web at a second position adjacent the other transverse extremity thereof, and with each of said teeth terminating along its upper extremity intermediate said positions of relatively greater and lesser heights along a line substantially free of abrupt changes in height above the web.

Another aspect of the invention involves the rasp bar defined in the preceding paragraph being detachably secured by threaded means to a backing plate (which latter can be a permanent part of the cylinder construction), such backing plate projecting from beneath the web of the rasp bar to define a downwardly inclined upper surface.

A still more limited although preferred aspect of the invention comprises a rasp bar such as defined in the penultimate paragraph wherein the first positions of relatively greater height of all of said teeth are adjacent one lateral edge of the web, with the transverse extremity of each of said teeth adjacent said one lateral edge being beveled toward said one lateral edge of the web from the top of the web to adjacent the first position of relatively greater tooth height.

Still another aspect of the present invention involves in rasp bar construction the improvement comprising an elongated base including contiguous, longitudinally extending first and second side portions, said first portion being generally horizontally disposed and having a longitudinally extending row of upstanding teeth thereon, said teeth being parallel to each other and extending transversely of and angularly inclined to the longitudinal extent of the first side portion, each of said teeth being of relatively greater height at a first position adjacent the transverse extremity thereof nearest said second portion and of relatively lesser height at a second position adjacent the transverse extremity remote from said second portion, each of said teeth terminating at its upper extremity intermediate said first and second positions along a line substantially free of abrupt changes in height above the web, said second portion having an upper surface that is inclined downwardly and laterally away from the first portion to terminate at a lateral edge disposed substantially below the bottom of the teeth.

A final aspect of the invention to be specifically pointed out involves a threshing cylinder comprising a plurality of elongated, parallel rasp bars circumferentially equally spaced and equidistant from the axis of such cylinder, said cylinder having a forward direction of rotation, each of said rasp bars including an elongated web having an outer surface remote from the axis of the cylinder having a general inclination to the travel path of the rasp bar during rotation of the cylinder such that during forward rotation of the cylinder the leading lateral edge of the web is closer spaced to the axis of the cylinder than is the trailing lateral edge of the web, a longitudinally extending row of teeth on the web extending radially outward from the axis of the cylinder, said teeth being parallel to each other and extending transversely of the web, and each of said teeth terminating at their radially outermost extremity throughout substantially their entire transverse extent at a substantially constant distance from the axis of the cylinder, the arrangement being such that during forward rotation of the cylinder the leading transverse end of each tooth is of substantially greater height relative to the outer surface of the web than is the trailing transverse end of such tooth.

An important feature of the invention is that the rasp bars can be readily detached for repair or replacement from the backing plates, it being noted that the latter are not subjected to severe wearing conditions and may be considered a permanent part of the threshing cylinder.

Still another important feature of the invention resides in each rasp bar having two aligned longitudinally extending rows of teeth that are oppositely inclined with respect to the longitudinal extent of the rasp bar, together with the fact that the junction (such two rows being substantially coterminous) being unequally spaced from the opposite ends of the rasp bar. This feature is extended to adjacent rasp bars having the sets of teeth thereon arranged reversely with respect to each other, and with the junctures being oppositely arranged or alternately disposed on opposite sides of a central vertical transverse plane of the cylinder.

The foregoing as well as other objects, aspects and features of the invention will become apparent during the following description of a preferred embodiment of the invention taken in conjunction with the accompanying drawings illustrative of such preferred embodiment of the invention, wherein.

Figure 1:
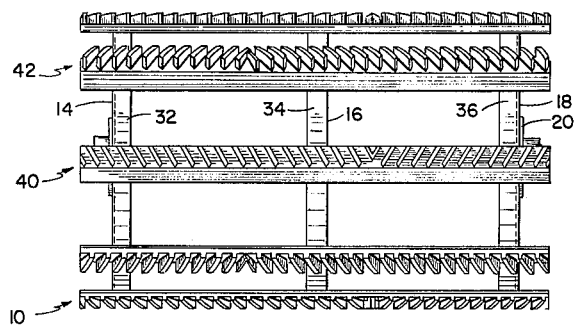
FIGURE 1 is a side elevational view of a threshing cylinder according to the invention.

Referring now to the drawings, wherein like numerals designate like parts throughout the various views, the reference numeral 10 designates the threshing cylinder generally, the same being comprised of a driving shaft or axle 12 to which are secured generally circular disks or plates 14, 16 and 18 for rotation therewith. The plates 14, 16 and 18 are secured to the shaft 12 by means of flanged collars fixed to the shaft 12, such as the flanged collar 20 shown in FIGURE 2 that attaches the plate 18 to the shaft 12.

Figure 2:
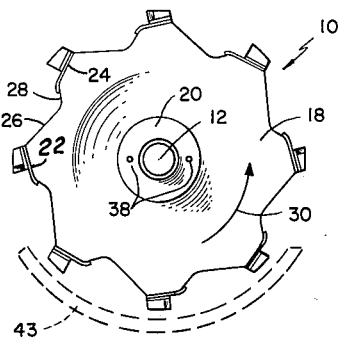
FIGURE 2 is an end elevational view of the threshing cylinder shown in FIGURE 1.

As clearly shown in FIGURE 2 with respect to the plate 18, each of the plates 14, 16 and 18 has an outer periphery defined by an even numbered plurality of straight sections such as those indicated at 22 and 24, with the outer periphery being provided with V-shaped indentations between such straight sections 22 and 24 as indicated by the periphral edges 26 and 28. It is important to note that the straight peripheral portions such as those indicated at 22 and 24 are equidistant from and symmetrical about the axis 12 of the cylinder 10, are equiangularly spaced about the axis of the cylinder 10, and are at their respective positions about the axis of the cylinder 10 all inclined at an acuate angle to radii connecting their midpoints to the axis of the cylinder 10. In other words, considering forward rotation of the cylinder 10 to be in the direction indicated by the arrow 30 in FIGURE 2, the forward or leading ends of all the straight sections such as those indicated at 22 and 24 are more closely spaced to the axis of the cylinder 10 than are their trailing or rear ends, as is clearly shown in FIGURE 2.

In the interest of strength and economy of materials, the entire outer peripheral extents of the plates or disks 14, 16 and 18 are provided with integral flanges 32, 34 and 36, respectively, with such plates and their flanged peripheries being preferably formed by stamping suitably shaped blanks of steel. Steel is of course the preferred material for the shaft 12 as well as for the flanged collars 20 (the latter being detachably secured to the shaft 12 by keys or set screws, not shown). As indicated with respect to the plate 18, the flanged collar 20 is detachably secured thereto by means of steel bolts 38, though of course steel rivets may be employed in lieu thereof if desired.

Rasp bar and backing plate assemblies designated generally at 40 and 42 are secured to the plates 14, 16 and 18 is spaced parallelism to the shaft 12. It will be noted on reference to FIGURE 2 that the assemblies 40 and 42 are respectively positioned on the cylinder 10 to overlie the straight and inclined peripheral portions of the plate 18 indicated at 22 and 24. It will of course be understood that the plates 14 and 16 have the same external configuration as plate 18 and that the assemblies 40 and 42 are mounted on portions thereof corresponding to the straight and inclined sections 22 and 24 of the plate 18.

The cylinder 10, including the rasp bar and backing plate assemblies 40 and 42 (alternately positioned about the cylinder 10) is as will be understood by those skilled in the art employed in conjunction with a threshing concave such as indicated in dashed outline at 43. An appreciation of the conventional relation of conventional threshing cylinders and concaves can be obtained from a brochure publicly distributed by the John Deere Company entitled Self-Propelled Combines and being designated at the lower left corner of the back cover (page 40) of the brochure as "A1241–59–8-Harvester." Such brochure includes on pages 12, 13, 14, 15 and on the inside of a fold-out sheet at the center of such publication excellent illustrations of typical associations of threshing cylinders and concaves with cooperating equipment. Indeed, this invention is concerned with an improvement over inclined rasp bar type cylinder systems such as exemplified in such brochure, as well as an improvement over rasp bars of the character disclosed in my U.S. Patent No. 3,034,513, entitled Reversible Bar For Threshing Cylinders, and issued May 15, 1962. The disclosures of such publication and the patent are incorporated in this specification by way of reference.

The rasp bar and backing plate assemblies 40 and 42 are identical except to the extent hereinafter specifically pointed out, and a detailed description of the assembly 42 will for the most part suffice for both. The construction of the rasp bar and backing plate assembly 42 will be appreciated upon reference to FIGURES 5 and 6, wherein the same will be seen to be comprised of a backing plate 50 and a rasp bar 52. The backing plate 50 is elongated and of substantially uniform thickness, the same in transverse cross section including a flat portion 54 shown to be horizontal in FIGURE 5 that smoothly merges along one lateral margin thereof with an integral downwardly curved portion 56. The flat horizontal portion 54 of the backing plate 50 is positioned on the plates 14, 16 and 18 so as to seat flush against the straight peripheral extents thereof corresponding to the straight peripheral portion 24 of the plate 18. The flat portion 54 of the backing plate 50 is either detachably or permanently secured to the flanges 32, 34 and 36 of the plates 14, 16 and 18 underlying the same by any suitable means, such as by welding, bolts or riverts, not shown. As clearly shown in FIGURE 2, the downwardly curved or lip portion 56 of the backing plate 50 overlies the part of the indentation in the plate 18 designated at 28, and such portions of the structure may be dimensioned so as to seat flush with each other, it being understood that such relationship is also true with respect to the lip 56 and the flanges 32 and 34 of the plates 14 and 16.

As thus far described, it will be seen that on forward direction of rotation of the cylinder 10 as indicated by the arrow 30, the backing plate 50 presents a leading lateral portion having an upper or outer convex surface 57 defined by the lip 56 of the backing plate 50, and this is trailed or followed by the flat portion 54 of the backing plate 50 in an arrangement such that the upper or outer surface of the backing plate 50 at the juncture 58 of the portions 54 and 56 is more closely spaced to the axis of the cylinder 10 than is the upper or outer trailing edge 60 of the portion 54 of the backing plate 50.

Figure 5:
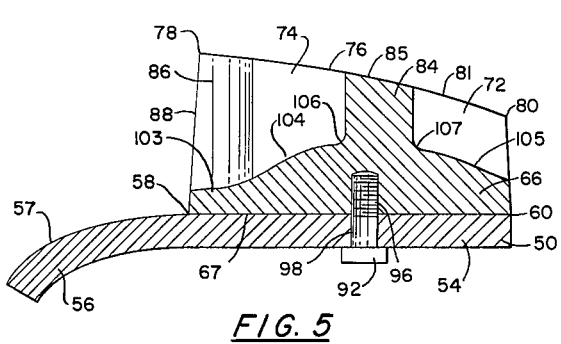
FIGURE 5 is an enlarged transverse sectional view taken upon the plane of the section line 5—5 in FIGURE 3; and, FIGURE 6 is also an enlarged (though on a somewhat smaller scale than FIGURE 5) transverse sectional view taken on the plane of the section line 6—6 in FIGURE 3.
Figure 6:
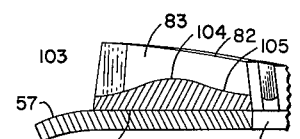

The rasp bar 52 comprises an elongated approximately flat web 66 that in transverse cross section has a flat bottom 67 as shown in FIGURES 5 and 6. The upper surface of the web 66 can be flat so that the web 66 is rectangular in transverse section; however, as will be subsequently described, the upper surface of the web 66 is preferably in transverse section of curved character. As clearly shown in FIGURES 5 and 6, the web 66 is coextensive with the flat portion 54 of the backing plate 50 and the flat bottom 67 thereof is seated flush against the upper surface of the portion 54.

Two longitudinally extending rows or sets of upstanding teeth 68 and 70 are integrally carried by the web 66. All the teeth of the set 68 thereof, of which teeth 72 and 74 are representative, are parallel to each other and extend transversely across the web 66 at an angle inclined to the major longitudinal dimension of the assembly 42. All the teeth of the set 68 thereof extend upwardly from the upper surface of the web 66 (radially outward from the axis of the cylinder 10), and throughout substantially their entire transverse extent across the web 66 terminate above the web 66 in an arc of a circle having the axis of the cylinder 10 as its center. In other words, the tooth 74 defines along its upper extremity an arc 76 extending from a position of maximum tooth height 78 relative to the bottom 67 of the web 66 adjacent the leading transverse edge of the web 66 and the tooth 74 to a position of minimum tooth height 80 relative to the bottom 67 of the web 66 adjacent the trailing or rear edge of the web 66 and the tooth 74 (note that the arc 76 of the tooth 74 lies directly behind the identical arc 81 of the tooth 72). The entire arc of a single tooth is shown respectively at 82 and 83 in FIGURE 6. While it is not absolutely essential that the upper edge of the teeth 68 be of arcuate configuration, it is deemed highly preferable that the teeth throughout their entire transverse extent between the positions 78 and 80 be of heights intermediate such maximum and minimum heights. It is of course deemed essential to the practice of the instant invention that the teeth be of substantially greater height relative to the web 66 adjacent their leading transverse ends than they are or adjacent their trailing transverse ends, and that the outer or uppermost extremities defining such maximum and minimum heights be substantially equidistant from the axis of the cylinder 10. If desired or deemed important in the interest of reducing manufacturing costs, the upper extremity of the transverse extent of each of the teeth 68 intermediate the maximum and minimum height positions 78 and 80 can be substantially along a straight line, or effectively along a chord of the described and preferred arc. It is again noted that in FIGURE 5 the central portion 84 of the tooth 72 is shown in section, and that the arcuate upper extremity 85 of such central portion 82 and the trailing portion of the tooth 72 directly overlies the exactly corresponding curvature of the upper extremity of the tooth 74. In short, the upper trailing extremity of the tooth 72 directly overlies the corresponding position of the minimum height 80 of the tooth 74.

Figure 3:
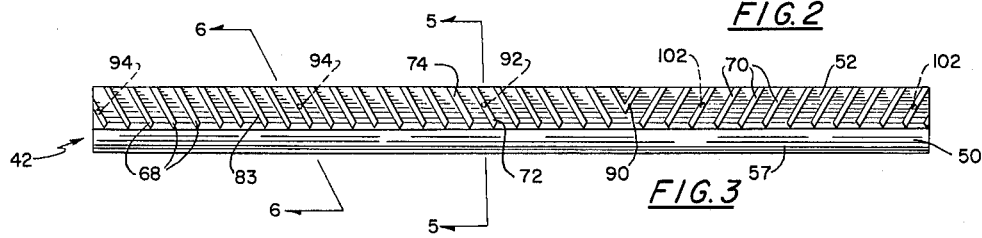
FIGURE 3 is a top plan view of one of the rasp bar and backing plate assemblies in the cylinder construction shown in FIGURES 1 and 2, this view being taken upon an enlarged scale and substantially perpendicular to the web underlying the teeth.

The leading transverse end of each of the teeth 68 is beveled as shown in FIGURE 3. A fuller appreciation of the character of such bevel is obtained on inspection of FIGURE 5, wherein the leading transverse end of the tooth 74 is shown as having a beveled surface 86 such that the tooth 74 has a sharp leading edge 88 extending from the upper surface of the web 66 to the position 78 of the tooth 74 having the maximum height.

While the rasp bar 52 can include and may preferably only have a single set of parallel teeth, such as the set of teeth 68, extending the entire length of the rasp bar, this invention also encompasses the provision of the illustrated second set of teeth 70. The set of teeth 70 is substantially identical to the previously described set of teeth 68, and essentially differs therefrom only by being oppositely inclined to the longitudinal extent of the rasp bar 52 relative to the set of teeth 68. In short, the set of teeth 70 are symmetrical (mirror image) to the set of teeth 68 with respect to a transverse plane perpendicular to the longitudinal extent of the rasp bar 52. It will be noted that the juncture of the sets of teeth 68 and 70 is defined by a single V-shaped tooth 90 having its apex toward the leading edge of the rasp bar 52 inasmuch as the individual teeth of the sets 68 and 70 converge toward the leading edge of the rasp bar 52. It will also be noted that the tooth 90 disposed at the juncture of the sets of teeth 68 and 70 is asymmetrically disposed with respect to the longitudinal extent of the rasp bar 52, and is more closely spaced to the right end of the rasp bar 52 as shown in FIGURE 3.

The rasp bar 52 is detachably secured to the backing plate 50 by means of cap screws such as indicated at 92 and 94 in FIGURE 3. The cap screws 92 and 94 are preferably disposed so as to underlie the teeth 68 for purposes of greater strength and additionally to permit a greater depth of rasp bar 52 penetration by the cap screws 92 and 94. This construction will be readily understood on reference to FIGURE 5, wherein it will be seen that the threaded shank 96 of the cap screw 92 is loosely received through an opening 98 in the backing plate 50 and is threadingly received in a blind internally threaded bore 100 that extends through the web 66 and is directed toward the tooth 72 (and if desired can extend up into the tooth 72), with the head portion of the cap screw 92 bearing against the underside of the backing plate 50 as shown. Corresponding cap screws such as indicated at 102 secure the backing plate 50 to that portion of the rasp bar 52 on which the set of teeth 70 are integrally disposed.

As indicated previously, the upper surface of the web 66 can be flat; however, it is preferred that, as shown, the upper surface of the web 66 in transverse section be of curved character. The curved character of the upper surface of the web 66 can be such as disclosed in my previously mentioned patent; however, since the rasp bars of this invention are not "reversible," the curvature of the upper surface of the web 66 need not be symmetrical about a central vertical medial plane. The curvature of the upper surface of the web is free of abrupt changes of curvature, and preferably as shown in FIGURES 5 and 6 is defined by a line portion 103 that is substantially horizontal or slightly inclined upwardly to the rear near the leading edge of the web 66, thence smoothly merging with a convex curved portion 104 near the transverse center line of the web 66. The curve can then extend substantially horizontally to the rear edge of the web 66 from the greatest height of the portion 104 above the bottom 67 of the web 66, but it is preferred in the interest of economy of metal and weight that the portion 104 curve smoothly downward to the rear edge of the web as shown in FIGURES 5 and 6 at 105.

The provision of the preferred (but optional) transverse upper surface curvature of the web 66 as indicated by the portions 103, 104 and 105 results in several advantages. The additional metal increases strength and obviously enables greater cap screw penetration (for securing the plate 50 and the rasp bar 52 together) without extending the screws up into the teeth. Furthermore, as explained in my previously mentioned U.S. patent, the described curvature smoothly urges radially outward movement of material to be threshed that has entered between the leading edges of adjacent teeth into position to be rubbed and threshed between the concave 43 and the outer ends of the teeth. It will be understood of course that neglecting the teeth (and a slight amount of fairing, as at 106 and 108 at the roots of the teeth) that the cross section of the web 66 is uniform throughout the longitudinal extent of the rasp bar 52.

The rasp bar 52, including the web 66 and the teeth 68 and 70 integral therewith, is preferably cast ductile iron and is known as "perlite malleable." The hardness of such rasp bar or at least the teeth thereof is preferably from about 180 to about 240 Brinell. The backing plate 50 can be of mild steel, if desired.

Figure 4:
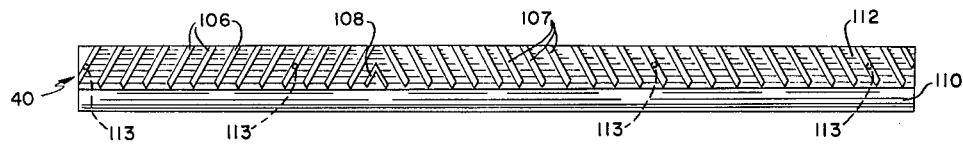
FIGURE 4 is a top plan view similar to FIGURE 3 of yet another of the rasp bar and backing plate assemblies used in the cylinder construction shown in FIGURES 1 and 2.

The rasp bar and backing plate assembly 40 is also secured to the plates 14, 16 and 18 by any suitable means and differs only from the previously described assembly 42 in that sets of teeth 106 and 107 are oppositely inclined with respect to the sets of teeth 68 and 70 respectively, the arrangement being such that the individual teeth of the sets of teeth 106 and 107 converge rearwardly, whereby a V-shaped tooth 108 is defined at the juncture of the sets 106 and 107 having its apex directed rearwardly. It will also be noted that the V-shaped tooth 108 is asymmetrically disposed and is near the left end of the assembly 40 as shown in FIGURE 4.

The assembly 40 includes a backing plate 110 that is identical to the backing plate 50, and the assembly 40 includes a rasp bar 112 (with respect to which the sets of teeth 106 and 107 are integral) detachably secured to the backing plate 110 by cap screws 113, it being especially important to note that the upper extremities of each tooth of the sets 106 and 107 are throughout substantially their entire transverse extent equidistant from the axis of the cylinder 10, as in the case of the upper extremities of the sets of teeth 68 and 70 previously described. It should also be noted that the upper extremities of the V-shaped teeth 90 and 108 are also throughout their entire transverse extent equidistant from the axis of the cylinder 10.

Rasp bar and backing plate assemblies corresponding to the assemblies 40 and 42 are alternately disposed about the circumference of the cylinder 10, it being again noted that the cylinder 10 employs an even total number of such types of assemblies. While an odd number of assemblies such as the assembly 40 may be employed, the total number of assemblies will be an even number inasmuch as a corresponding number of assemblies such as the assembly 42 will be employed.

It is not essential that each rasp bar assembly include two sets of oppositely inclined teeth as illustrated, but it is deemed important when each rasp bar includes a single set of parallel teeth all inclined in one direction for the whole length of the bar that the teeth of the rasp bars of adjacent assemblies be oppositely inclined with respect to each other. In other words, all the teeth of the assembly 42 would be inclined like the teeth 68 and all of the teeth of assembly 40 would be inclined like the teeth 106. On the other hand, if structure in the nature of the illustrated assemblies is to be employed, it is much preferred that the junctures of the oppositely inclined sets of teeth of adjacent assemblies be displaced from each other relative to the longitudinal dimension of the cylinder 10. In short, tracking of adjacent junctures is to be avoided in order to minimize uneven wear rates in the vicinities of the junctures.

The operation of the cylinder 10 in conjunction with the concave 43 should be readily understood by those skilled in the art. The cylinder 10 is driven to rotate in the direction indicated by the arrow 30 in FIGURE 2, such cylinder 10 being in spaced proximity to the threshing concave 43. The inclination of the webs of the rasp bars and the backing plates greatly facilitates or increases the "suck," "bite" or "draw" as the tendency of the cylinder to cause movement into the concave is often termed. However, merely production of the desired suction does not in and of itself accomplish the desired threshing action. The desired action is accomplished largely by the rubbing of the material to be threshed between the concave and the teeth, this rubbing tending to alternately rub the material toward the opposite ends of the concave as successive rasp assemblies travel by the material during progress of the latter during its travel between the cylinder and the concave from entry to exit from the space (left to right as seen in FIGURE 2).

Inasmuch as the teeth of the rasp bars of this invention substantially conform at their outer radial extremities to a circular cylindrical surface concentric with the cylinder axis for substantially their entire transverse extent (both in their inclined direction and in their angular extent about the axis of the cylinder), and inasmuch as the angular extent of the teeth through which the teeth conform to a cylindrical surface coincides with the entire or at least considerable portion of the angular extent of the inclined web integral with such teeth, such angular extent is effective for both enhancing bite or suction and threshing. The inclined upper (radially outward) surface of the web intermediate the individual teeth is effective for urging material radially outward to a position such that the latter is quickly subjected to the rubbing or threshing action, and this is accomplished with the minimum drag or power load on the cylinder driving means (not shown) and minimum damage to the desired product (grain cracking, etc.). This latter is true even if the upper surface of the web is flat; however, the illustrated curved upper surface is preferred.

The illustrated structure enhances suction or draw and additionally facilities threshing action as stated; however, yet another important advantage accrues from the teeth being of relatively greater height near the leading edge of an inclined web in that any tendency of the inclined upper surface of the web to unevenly wedge or pack the material between the web and the concave (when the portions of the teeth adjacent the leading edge of the web are short or terminate relatively closer to the cylinder axis than any trailing or intermediate portion of the teeth) is very largely reduced under any given set of conditions for the reason that the leading transverse ends are effective to spread or evenly distribute material along the concave in the direction of the axis of the cylinder prior to clumps of material becoming packed and possibly jamming the cylinder.

Indeed, it would be desirable for the teeth to be of the greatest possible height and extended to the leading edge of the backing plate were it not the fact that the leading edge of the backing plate being very substantially spaced from the concave, though of course even this could be done and is within the scope of the invention.

As previously explained, there is virtually no tendency for material to become wedged between the concave and the outermost extremities of the teeth, and it should also be noted insofar as the rasp bar is concerned material is substantially only positively forced radially outwardly by the web rather than by the extremities of the teeth, thereby reducing unnecessary tooth wear.

Because of the radial height with respect to the axis of the cylinder of all the teeth being substantially uniform throughout substantially their entire transverse extent in conjunction with a web traveling so as to progressively urge material radially outward, the threshing cylinder 10 can be used without as great a need for adjustment of concave-cylinder spacing adjustment for a greater range of moisture conditions than would otherwise be practical or feasible. Also, a lesser amount of power is required for a given set of threshing conditions and rate of material handling because the material is to a very large extent subjected immediately to spreading and threshing action adjacent the leading lateral edge of the rasp bar.

It will be manifest to those skilled in the art that the illustrated and described preferred embodiment of my invention is susceptible to numerous variations in detail without departing from the spirit of the invention. For example, the backing plates and the rasp bars can be integrally formed, and/or the leading edges of the webs can be tapered so that the upper surfaces of the leading edges thereof tend to fair into the upper surface of the curved lip portions of the backing plates. The backing plates need not necessarily be curved at their leading lateral margins; however, it is preferred that such be the case in order to enhance the tendency for material being threshed to be passed into the space between the radial extremities of the teeth and the concave.

In view of the foregoing, attention is directed to the appended claims in order to ascertain the actual scope of the invention.

I claim:

1. A threshing cylinder comprising a plurality of elongated, parallel rasp bars circumferentially equally spaced and equidistant from the axis of such cylinder, said cylinder having a forward direction of rotation, each of said rasp bars including an elongated web having an outer surface remote from the axis of the cylinder and disposed at a general inclination to the circumference of the cylinder with the leading lateral edge of the web being closer spaced to the axis of the cylinder than is the trailing lateral edge of the web, a longitudinally extending row of teeth on the web extending radially outward from the axis of the cylinder, said teeth being parallel to each other and extending transversely of the web, and each of said teeth terminating at their radially outermost extremity throughout substantially their entire transverse extent at a substantially constant distance from the axis of the cylinder, the arrangement being such that during forward rotation of the cylinder the leading transverse end of each tooth is of substantially greater height relative to the outer surface of the web than is the trailing transverse end of such tooth.

2. The combination of claim 1, wherein the web projects forwardly of the leading transverse extremities of the teeth and the outer surface of such projecting portion of the web is inclined radially inwardly.

3. A threshing cylinder comprising an even number of elongated, parallel rasp bars circumferentially equally spaced and equidistant from the axis of such cylinder, said cylinder having a forward direction of rotation, each of said rasp bars including an elongated web having an outer surface remote from the axis of the cylinder and disposed at a general inclination to the circumference of the cylinder with the leading lateral edge of the web being closer spaced to the axis of the cylinder than is the trailing lateral edge of the web, a longitudinally extending row of teeth on the web extending radially outward from the axis of the cylinder, said teeth being parallel to each other and extending transversely of the web at an angle inclined to the longitudinal extent of the web, each of said teeth terminating at their radially outermost extremity throughout substantially their entire transverse extent at a substantially constant distance from the axis of the cylinder, the arrangement being such that during forward rotation of the cylinder the leading transverse end of each tooth is of substantially greater height relative to the outer surface of the web than is the trailing transverse end of such tooth, and the teeth of adjacent rasp bars being oppositely inclined.

4. The combination of claim 3, wherein the leading transverse extremity of each tooth is beveled from the upper surface of the web to the radial extremity of the tooth to present a relatively sharp radially extending leading edge in relation to the thickness of the tooth.

5. The combination of claim 4, including a backing plate underlying the web, such backing plate projecting forwardly of the web and the outer surface of the projecting portion of the backing plate being inclined radially inwardly, and threaded means releasably securing the web and the backing plate together.

6. The combination of claim 5, wherein the radial extremities of all of the teeth are essentially coincident with a circular cylindrical surface concentric with the axis of the cylinder, whereby an essentially constant spacing between a position on a concave and the radial extremity of each tooth throughout rotational travel of such tooth by said position is obtained.

References Cited by the Examiner

UNITED STATES PATENTS

| 788,088 | 4/1905 | Berndt | 130—27.85 |
| 2,796,868 | 6/1957 | Oliver | 130—27.85 |
| 3,034,513 | 5/1962 | Ausherman | 130—27.85 |

FOREIGN PATENTS 1,248  11/1887  Great Britain.

ABRAHAM G. STONE, *Primary Examiner.*

T. GRAHAM CRAVER, *Examiner.*

JOE O. BOLT, *Assistant Examiner.*